United States Patent
Ricketts et al.

(10) Patent No.: US 6,908,378 B2
(45) Date of Patent: Jun. 21, 2005

(54) THRESHING ROTOR INLET FLIGHT EXTENSION

(75) Inventors: Jonathan E. Ricketts, Viola, IL (US); Kelvin Bennett, Geneseo, IL (US)

(73) Assignee: CNH America LLC, Racine, WI (US)

(*) Notice: Subject to any disclaimer, the term of this patent is extended or adjusted under 35 U.S.C. 154(b) by 0 days.

(21) Appl. No.: 10/623,781

(22) Filed: Jul. 21, 2003

(65) Prior Publication Data

US 2005/0020329 A1 Jan. 27, 2005

(51) Int. Cl.⁷ ............................................... A01F 12/10
(52) U.S. Cl. .................................................. 460/70
(58) Field of Search ...................... 460/68, 70; 198/660, 198/661, 676

(56) References Cited

U.S. PATENT DOCUMENTS

| | | | | |
|---|---|---|---|---|
| 3,828,793 A | * | 8/1974 | Gochanour | 460/70 |
| 3,964,492 A | | 6/1976 | Crego et al. | 130/27 |
| 3,982,549 A | * | 9/1976 | De Pauw et al. | 460/67 |
| 4,148,323 A | | 4/1979 | McMillen et al. | 130/27 |
| 4,178,943 A | * | 12/1979 | West | 460/80 |
| 4,248,248 A | | 2/1981 | De Busscher et al. | 130/27 |
| 5,145,462 A | | 9/1992 | Tanis et al. | 460/68 |
| 5,387,153 A | * | 2/1995 | Tanis | 460/68 |
| 5,413,531 A | * | 5/1995 | Tanis | 460/72 |
| 6,036,598 A | * | 3/2000 | Harden et al. | 460/66 |
| 6,050,894 A | * | 4/2000 | Johnson | 460/68 |
| 6,083,102 A | | 7/2000 | Pfeiffer et al. | 460/68 |
| 6,129,629 A | * | 10/2000 | Dammann et al. | 460/67 |
| 6,296,566 B1 | * | 10/2001 | Tanis et al. | 460/70 |
| 6,688,970 B2 | * | 2/2004 | Tanis | 460/68 |

\* cited by examiner

*Primary Examiner*—Árpád Fabián Kovács
(74) *Attorney, Agent, or Firm*—Brant T. Maurer; Rebecca Henkel

(57) ABSTRACT

The extension has an elongate blade shape and is positionable in radially outwardly extending relation along a leading edge of a rotor inlet flight, the blade having a leading edge located forwardly of the leading edge of the flight so as to rotate in advance thereof. The leading edge preferably has a curved, swept back shape relative to the rotational direction, which gradually increases in slope in the radial outward direction, so as to facilitate smooth acceleration of the crop material in the radial outward direction. The extension has a rearwardly facing blade or crop flow surface oriented at an angle of attack less than the angle of attack of the associated flight, so as to be less blunt and to facilitate smooth crop material flow onto the flight. The extension shape generates a rearwardly directed air flow when rotated.

8 Claims, 3 Drawing Sheets

THRESHING ROTOR INLET FLIGHT EXTENSION

TECHNICAL FIELD

This invention relates generally to a rotor for a threshing system of an agricultural combine, and more particularly, to an extension for the leading edges of inlet ends of helical flights of a rotor for improving crop material and airflow characteristics thereof.

BACKGROUND

A well known form of harvesting machine is a rotary combine. A typical combine includes crop harvesting apparatus which reaps grain stalks and other plant materials and feeds them to separating or threshing apparatus. The grain stalks or other crop and plant materials harvested in the field are moved rearwardly from a crop harvesting header assembly and introduced for threshing to the rotor assembly by a crop feeder assembly.

In a rotary combine, the rotor assembly includes a generally tubular rotor housing or cage mounted in the combine body. A rotatably driven rotor is coaxially mounted within the housing. The rotor comprises a front infeed or inlet section and a more rearward cylindrical threshing section, and is supported at opposite ends by front and rear bearing assemblies.

The cylindrical threshing section of the rotor and the rotor housing mount cooperating threshing elements which separate grain from other material in a threshing zone. The crop material is threshed as it spirals around the rotor threshing section and passes through openings in the rotor housing.

The ability to transfer crop materials from the feeder assembly to the threshing zone of the rotor assembly is a key to efficient combine operations. Many rotary combine rotors include an infeed or inlet section impeller comprised of a series of impeller blades or flights arranged at a forward end of the rotor. The impeller flights rotate within a transition region which is a part of the rotor housing. During harvesting operations, the generally linear movement of the crop materials received from the feeder assembly is converted by the rotor impeller flights in the transition region into a rotating, circulatory movement, in a rearward and radially outward direction. Reference in this regard, Tanis et al., U.S. Pat. No. 5,145,462 issued to Case Corporation.

If the infeed or inlet section of the rotor is operating inefficiently or poorly, power requirements of the rotor can be increased, the section can plug with crop materials, and components can suffer premature wear. Operational noise levels can also be heightened. Additionally, it has been found that it is desirable to have an air flow through the transition region from the feeder to the threshing apparatus, such that a large volume of airborne dust and other particulates do not exit the machine and impair the operator's view of the crop harvesting apparatus and operation thereof. An indication of poor airflow will typically be a dust cloud above and around the feeder.

Accordingly, what is sought is an improvement to threshing rotor inlet flights which facilitates crop material flow from a feeder to the threshing region, and which substantially reduces or eliminates outward air flow from the feeder and inlet region of the threshing apparatus.

SUMMARY

According to the invention, an extension for a threshing rotor inlet flight for an agricultural combine, is disclosed. The rotor is rotatable in a predetermined direction about a rotational axis. The flight includes a leading edge extending radially outwardly from a forward inlet end of the rotor and a rearwardly facing helical crop flow surface extending rearwardly from the leading edge at a first predetermined angle of attack relative to a plane perpendicular to the rotational axis, for conveying crop material from adjacent the forward inlet end of the rotor rearwardly. The present extension has an elongate blade shape and is positionable in radially outwardly extending relation along the leading edge of the flight, the blade having a leading edge located forwardly of the leading edge of the flight so as to rotate around the axis in advance thereof. The leading edge preferably has a curved, swept back shape relative to the rotational direction, which gradually increases in slope in the radial outward direction, so as to facilitate smooth acceleration of the crop material in the radial outward direction. The extension additionally has a rearwardly facing blade or crop flow surface oriented at a second predetermined angle of attack relative to the plane perpendicular to the rotational axis which is less than the first angle of attack of the helical crop flow surface of the associated flight, so as to be less blunt and to facilitate smooth crop material flow onto the helical crop flow surface.

As a result of the present inlet flight extension, radial outward and rearward flow of crop materials from the feeder through the transition section to the threshing apparatus is improved. A rearward air flow in the transition section is also achieved, which has been observed to nearly eliminate dust outflow from the transition region of the threshing apparatus.

As another advantage, the present flight extensions are preferably separate, removable members, so as to be easily and inexpensively replaceable when worn, damaged, or when extensions having different operating characteristics are desired to be used. The removability also allows operation without the extensions, if desired.

DETAILED DESCRIPTION OF THE PREFERRED EMBODIMENTS

Figure 1:
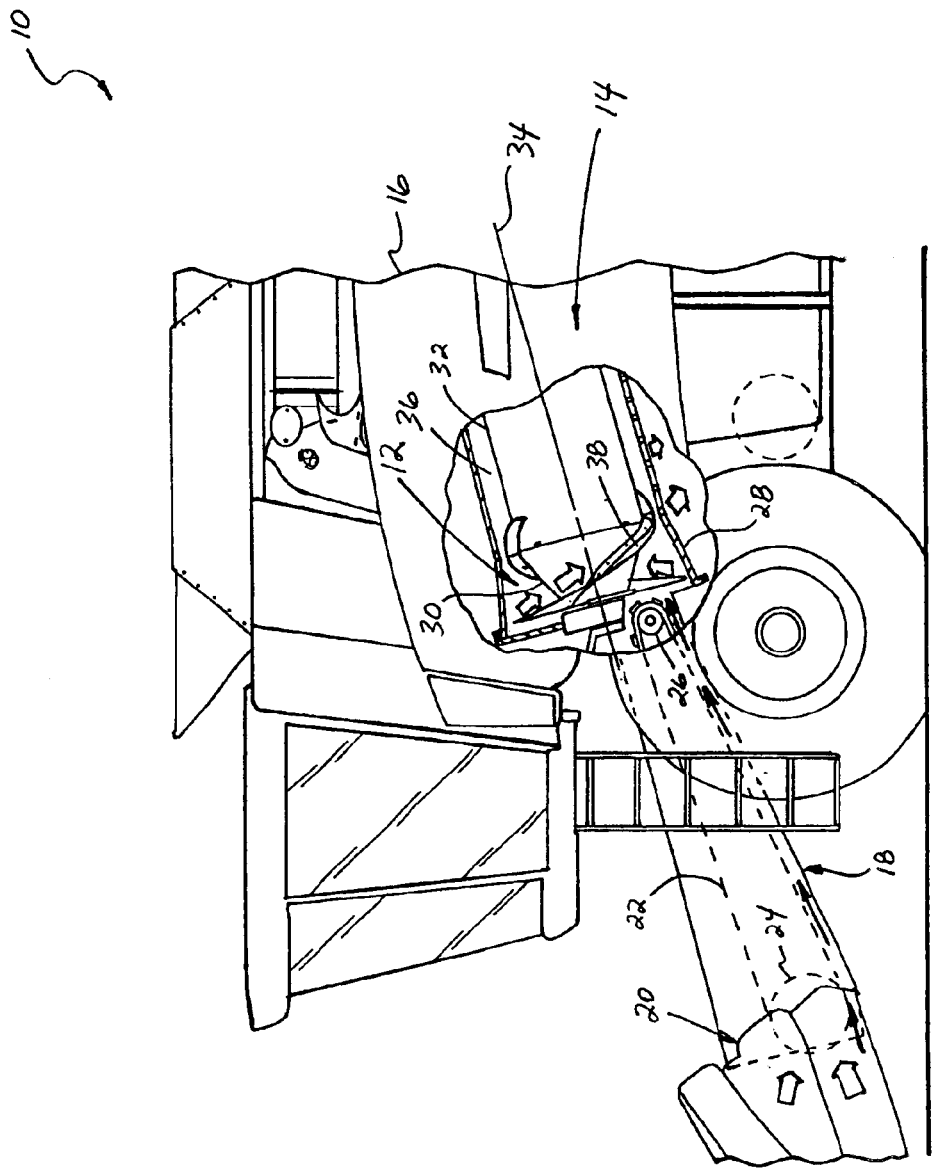
FIG. 1 is a fragmentary side view of a front end of an agricultural combine, showing a front inlet end of threshing apparatus thereof.

Referring now to the drawings, in FIG. 1, a front end of an agricultural combine 10 is shown, including a front inlet end 12 of threshing apparatus 14 thereof. Threshing apparatus 14 is contained within a body 16 of combine 10 in position for receiving a flow of crop material (small black arrows) from a rear outlet of a feeder 18. Feeder 18 receives the crop material from a header 20 mounted to a front end thereof, which severs the crop material from the ground and gathers it into a front mouth or opening of feeder 18 for conveyance to threshing apparatus 14. Feeder 18 includes endless chains 22 which encircle a forward drum 24 and a rearward sprocket shaft 26 which is rotated to move chain 22 in the counterclockwise direction for feeding a mat of crop material linearly along a bottom surface of feeder 18 into a front transition section 28 of threshing apparatus 14. Front inlet end 12 of threshing apparatus 14 includes a frusto-conical front section 30 on a cylindrical threshing rotor 32 supported for rotation in a predetermined direction about a rotational axis 34 therethrough. In transition section 28, it is desirable and necessary for the crop materials to make a transition from the linear movement of feeder 18 to a rotating, circulatory movement in the rearward and radially outward direction, for passage into a generally annular shape space 36 around rotor 32 wherein the materials are threshed. To effect such transitional radial outward circulatory movement, front section 30 includes a pair of helical inlet flights 38 and 40 in diametrically opposed relation therearound.

Figure 3:
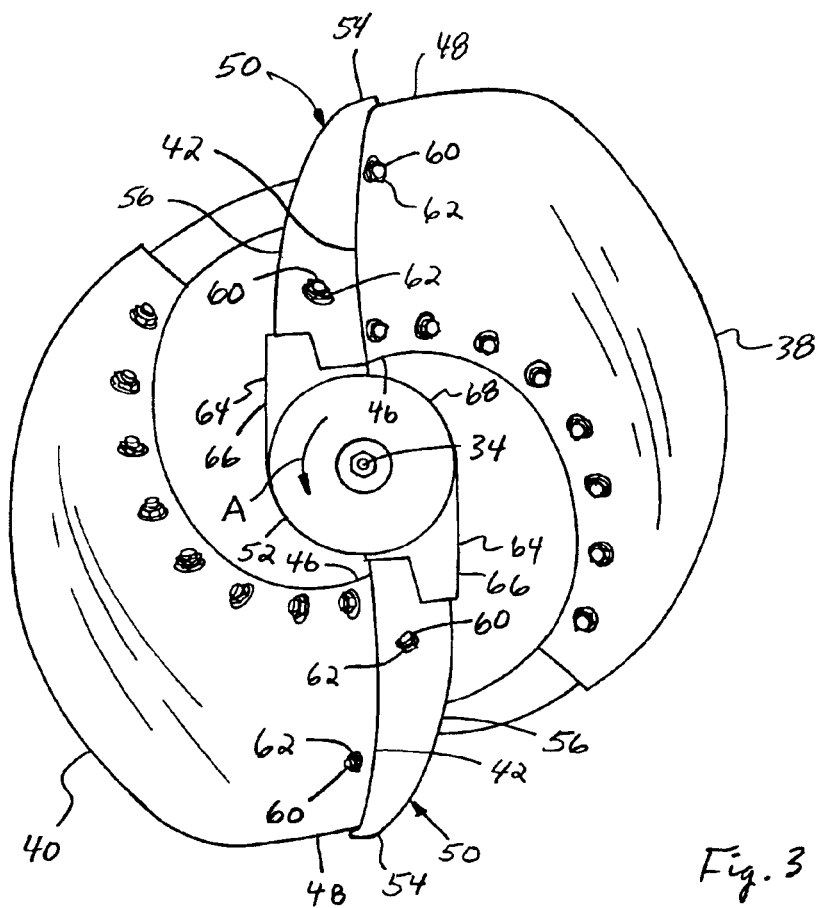
FIG. 3 is a front view of the threshing rotor of FIG. 1, showing the flight extensions of the invention.
Figure 2:
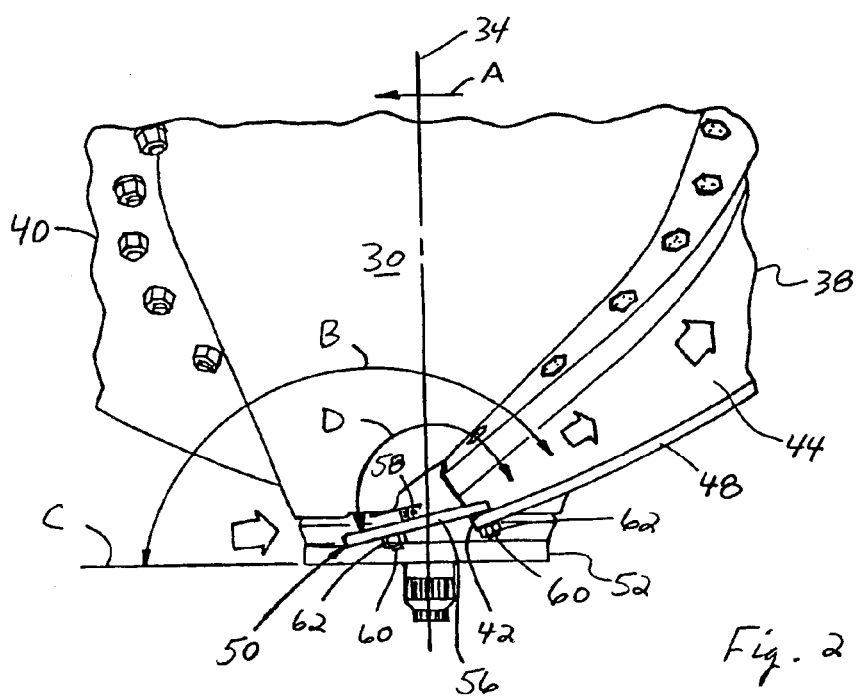
FIG. 2 is a fragmentary top view of a front inlet end of threshing rotor of the threshing apparatus of FIG. 1, showing an inlet flight extension of the invention thereon.

Referring also to FIGS. 2 and 3, rotor 32 is rotatable about axis 34 in the direction denoted by arrows A. Flights 38 and 40 each include a forwardmost leading edge portion 42 which leads the flight 38 or 40 when rotated in direction A, and a rearwardly facing helical crop flow surface 44 which extends from leading edge 42 rearwardly and oppositely with respect to rotational direction A around front section 30 of rotor 32. As best shown in FIG. 3, leading edge 42 extends generally radially outwardly relative to rotational axis 34 from a radial inner edge 46 to a radial outer edge 48. Radial outer edge 48 includes a radially indented portion adjacent leading edge 42.

Figure 4:
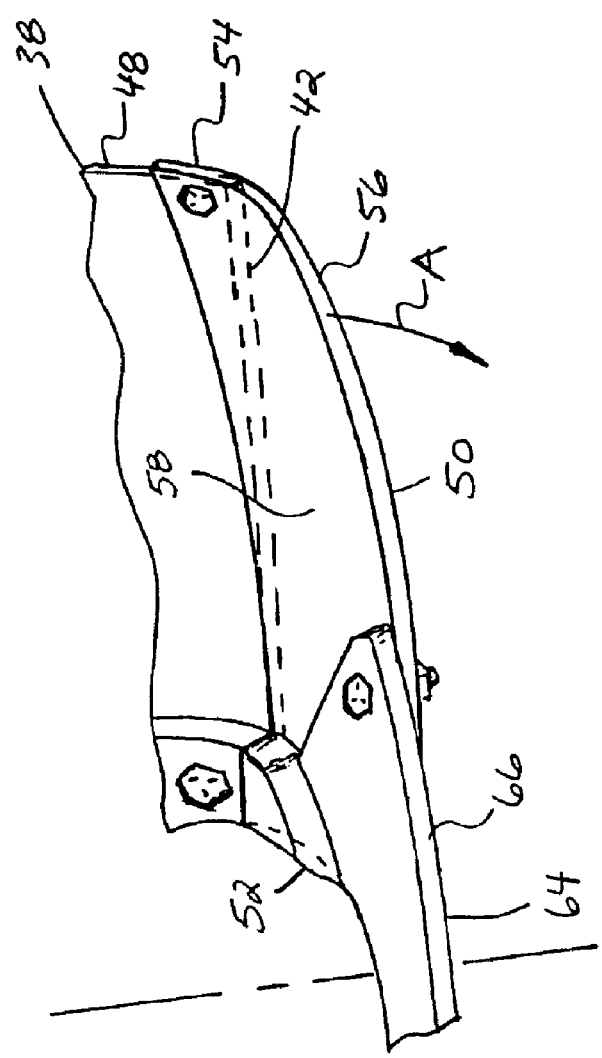
FIG. 4 is a fragmentary perspective view of the inlet flight extension of FIG. 2.

Referring also to FIG. 4, front section 30 of rotor 32 includes a pair of inlet flight extensions 50 which are essentially blade shape members extending radially outwardly along leading edges 42 of flights 38 and 40, from a central hub 52 mounted on front section 30, to radially outer tips 54 located adjacent radial outer edges 48. Each flight extension 50 has a leading edge 56 extending from hub 52 to tip 54, leading edge 56 preferably having a curved shape which is swept back relative to rotational direction A, toward tip 54. Each flight extension 50 additionally has a rearwardly facing crop flow surface 58 extending from leading edge 56 oppositely to the rotational direction to helical crop flow surface 44 of the respective inlet flight 38 or 40. Also preferably, each flight extension 50 is a separate member which is attached to hub 52 and inlet flight 38 or 40 using suitable fasteners, such as bolts 60 which extend therethrough and are secured by nuts 62. In this way, flight extensions 50 can be relatively easily replaced when worn or damaged, or when a flight extension having different operating characteristics is desired, or when it is just desired to operate without the extensions. Here, hub 52 includes smaller flight extensions 64 located radially inwardly of larger flight extensions 50, extensions 64 slightly overlapping surfaces 58 of flight extensions 50.

Helical crop flow surface 44 of each inlet flight 38 and 40 is oriented at an angle of attack of about 135°, denoted at B in FIG. 2, relative to a plane C perpendicular to rotational axis 34. Rearwardly facing surface 58 of each flight extension 50 is oriented at a smaller angle of attack D relative to plane C, which is preferably at about a 147° angle to surface 44. Extensions 64 of leading edges 56 have swept back leading edges 66 which preferably extend or emanate tangentially from an outer diametrical periphery 68 of hub 52 to leading edges 56 of flight extensions 50, respectively.

Leading edges 66 emanating or extending tangentially from the outer periphery of hub 52 to swept back leading edges 56 of flight extensions 50 which extend radially outwardly to tips 54, in combination with crop flow surfaces 58 being oriented at a lesser angle of attack relative to crop flow surfaces 44, which are oriented at a substantially less aggressive angle of attack compared to other constructions such as disclosed in Tanis et al. U.S. Pat. No. 5,145,462 referenced above, has been found to provide good radial outward acceleration and rearward flow of crop materials in transition from feeder 18 to the threshing region. As another advantage, as a result of the shape of flight extensions 50, as they are rotated in direction A, they function as propellers for generating a rearward air flow, as denoted by the small white arrows in FIGS. 1 and 2, which has been found to be sufficient to draw air through feeder 18 and transition section 28, to substantially reduce airborne dust in the vicinity of the exterior of combine 10 in front of transition section 28 and above feeder 18, to improve operator visibility.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. An extension for a helical flight extending around a front inlet end of a rotor of a threshing system of an agricultural combine, the rotor being rotatable in a predetermined rotational direction about a rotational axis therethrough and the flight including a leading edge extending radially outwardly from the front inlet end of the rotor and a rearwardly facing helical crop flow surface extending rearwardly from the leading edge at a first predetermined angle of attack relative to a plane perpendicular to the rotational axis, for conveying crop materials from adjacent the inlet end of the rotor radially outwardly and rearwardly when the rotor is rotated, the extension comprising:

an elongate blade shape member removably mountable in radially outwardly extending relation along the radially outwardly extending leading edge of the flight, the blade shape member being disposed so as to be located forwardly of the leading edge of the flight with respect to the predetermined rotational direction along at least a substantial portion of a radial extent thereof when mounted thereon, the blade shape member having a leading edge having a curved swept back shape, and a rearwardly facing crop flow surface extending rearwardly with respect to the predetermined rotational direction from the leading edge of the blade shape member to the helical crop flow surface of the flight along substantially the entire radial extent of the blade member and is oriented at a second predetermined angle of attack less than the first predetermined angle of attack, such that when the rotor is rotated in the predetermined direction the member will accelerate crop material that comes into contact with the leading edge thereof radially outwardly and rearwardly onto the flight and generate a rearwardly directed air flow.

2. The extension of claim 1, wherein the leading edge of the blade shape member extends radially outwardly and rearwardly from adjacent the forward inlet end of the rotor to a radial outermost edge of the flight.

3. The extension of claim 2, further comprising a hub mountable to the rotor forwardly of the forward inlet end thereof and including a radially outwardly extending extension having a leading edge at least generally tangent to a curved radial outer periphery of the hub and extending radially outwardly to adjacent to a radial inner edge of the blade shape member.

4. The extension of claim 3, wherein the blade is separate from the hub and is mountable to the hub and the helical flight using fasteners.

5. The extension of claim 1, wherein the first angle of attack is about 135 degrees and the rearwardly facing crop flow surface of the blade shape member is oriented at about a 147 degree angle to the rearwardly facing helical crop flow surface of the flight.

6. A threshing rotor for a threshing system of an agricultural combine, comprising:

a front inlet section rotatable in a predetermined rotational direction about a rotational axis therethrough and a plurality of helical flights extending rearwardly and oppositely from the rotation direction around the inlet section, each of the flights including a front leading edge extending radially outwardly from a front end of the front inlet section and a rearwardly facing helical crop flow surface extending rearwardly from the leading edge at a first predetermined angle of attack of about 135 degrees relative to a plane perpendicular to the rotational axis; and elongate blade shape extensions mounted in radially outwardly extending relation along and forwardly of the leading edge of each of the flights in the predetermined rotational direction, respectively, each of the extensions having a leading edge having a curved shape which is swept back both rearwardly and relative to the predetermined rotational direction and extends to adjacent to a radial outermost edge of the flight and a rearwardly facing crop flow surface extending from the leading edge of the extension to the helical crop flow surface of the flight and oriented at a second predetermined angle of attack oriented at about a 147 degree angle relative thereto, such that when the rotor is rotated in the predetermined direction the extension will accelerate crop materials that comes into contact with the leading edge thereof radially outwardly and rearwardly to the flight and generate a rearwardly directed air flow.

7. The rotor of claim 6, wherein the extensions are removable from the flights.

8. The rotor of claim 6, further comprising a hub mountable to the front inlet end and including a curved radial outer surface and radially outwardly extending extensions having leading edges at least generally tangent to the curved radial outer surface and extending radially outwardly to adjacent to radial inner edges of the blade shape extensions, respectively.

* * * * *